United States Patent
Montgomery (10) Patent No.: US 7,248,097 B2
(45) Date of Patent: Jul. 24, 2007

(54) VOLTAGE-ACTIVATED, CONSTANT CURRENT SINK CIRCUIT

(75) Inventor: Sean Montgomery, Thatcham (GB)

(73) Assignee: Micrel, Inc., San Jose, CA (US)

( * ) Notice: Subject to any disclaimer, the term of this patent is extended or adjusted under 35 U.S.C. 154(b) by 216 days.

(21) Appl. No.: 10/932,815

(22) Filed: Sep. 2, 2004

(65) Prior Publication Data

US 2006/0049818 A1    Mar. 9, 2006

(51) Int. Cl.
 *G05F 1/10* (2006.01)
(52) U.S. Cl. ........................ 327/538; 327/542
(58) Field of Classification Search ........ 327/538, 327/543

See application file for complete search history.

(56) References Cited

U.S. PATENT DOCUMENTS

| | | | | |
|---|---|---|---|---|
| 4,864,213 A | * | 9/1989 | Kido | 323/222 |
| 4,868,703 A | * | 9/1989 | Borkowicz | 361/58 |
| 4,924,122 A | * | 5/1990 | Harris | 327/399 |
| 5,661,643 A | * | 8/1997 | Blakely et al. | 363/21.16 |
| 5,760,625 A | * | 6/1998 | Macks | 327/198 |
| 6,259,287 B1 | * | 7/2001 | Macks | 327/143 |

* cited by examiner

*Primary Examiner*—Kenneth B. Wells
(74) *Attorney, Agent, or Firm*—Sawyer Law Group LLP (57) ABSTRACT

Voltage-activated and accurate current sink, and method of providing same. In one aspect, a circuit for accurately sinking current includes a zener diode coupled to a power source at the cathode of the zener diode, and first and second transistors, where the first transistor has its collector coupled to the power source and its base coupled to the cathode of the zener diode, and the second transistor has its base coupled to the anode of the zener diode and its emitter coupled to ground. A resistor is coupled between the emitter of the first transistor and the collector of the second transistor.

27 Claims, 5 Drawing Sheets

VOLTAGE-ACTIVATED, CONSTANT CURRENT SINK CIRCUIT

FIELD OF THE INVENTION

The present invention relates generally to current regulation circuits, and more particularly to constant current sink circuits.

BACKGROUND OF THE INVENTION

Current sinks and regulators are used in a variety of applications and devices to provide a desired current to a circuit or device accurately and without large fluctuations. Some standards and devices require voltages and currents to be provided at accurate levels or within well-defined ranges, for operation and for detection and identification of characteristics or to determine whether a device is operating within a known standard.

One existing technology that makes use of such voltage and current regulation is Power over Ethernet for networked electronic devices. Electronic devices are often linked together via communication networks that allow the devices to communicate and share data. Local area networks (LANs), wide-area networks (WANs), the Internet, wireless networks, etc., are just some of the varieties of these communication networks. Several standard network implementations are widely used, such as Ethernet for copper cables used in LANs connecting multiple computers or other devices.

It is convenient for some devices to receive power over a network communication link, such as an Ethernet cable, rather than obtaining power from a separate source such as batteries or a standard electrical outlet. This allows the device to conveniently have a single cable connection for communication and operation. For example, Internet Protocol (IP) telephone devices can transmit voice data to another device over the Internet using IP or over other networks instead of over telephone wires. Like standard telephones, receiving power over the communication link allows the telephone to be provided in areas where there is no convenient separate power source. Other types of devices also benefit from receiving power over network links, such as wireless access points for wireless networking devices, video cameras, point-of-sale devices, security scanners or cameras, and other devices.

The Power over Ethernet (PoE) standard, also known as IEEE 802.3af, was created to meet the demand for devices that receive power over network communication links. PoE architecture consists of two elements: the power-sourcing equipment (PSE) and the powered device (PD). A powered device is a device that is drawing power or is requesting power over the data link. The PSE is the equipment that provides DC power to the powered device, and its main functions are to probe the network for powered devices, supply power to the device if a compatible powered device is detected, monitor the power on a link, and remove power from a link when power limits are exceeded or when a powered device is disconnected or no longer requests power.

The Power over Ethernet standard puts only minimal requirements on the powered device to acquire power from the power interface (PI). This helps to minimize the cost of these typically cost-sensitive devices so that the major burden of power control and device detection is put on the PSE, which is typically the more centralized, integrated and expensive part of the system. To prevent harm to non-compatible Ethernet devices by PoE technology, the 802.3af standard defines a powered device detection or "discovery" method. Power will only be applied by power-sourcing equipment if a powered device that is compatible with the standard has been successfully detected. The discovery process is effective at preventing power from being sent to devices inadvertently plugged into Ethernet outlets having PSE devices attached. The PSE can also classify a powered device before power is applied based on current levels in the powered device at predetermined voltage levels. A powered device classification or power class defines the maximum power required by the powered device during its operation and allows PSE devices to better manage limited power resources.

Since it is desired for the PSE to perform the detection and powering functions and for the powered device to minimize the cost of PoE components, the PoE components in the powered device should be simple and low-cost. However, one problem with currently-used PoE circuitry used in powered devices is that high-cost components are commonly used. For example, existing classification circuits, used in powered devices for enabling the PSE to classify the devices, use high cost operational amplifiers and high voltage level shift circuits that have been formed using "BCD" (bipolar-CMOS (Complementary Metal Oxide Semiconductor)-DMOS (Double Diffused MOS)) processes. For example, a high voltage, low dropout voltage regulator feeding a fixed resistor can be used for a classification circuit, but requires a bipolar "pass element" transistor, operation amplifier, voltage reference, and a level shifter including two or more transistor switches for level shifting the operational amplifier output to the pass element transistor's base-gate connection. These types of components significantly increase the cost of the powered device.

Accordingly, what is needed is an apparatus for providing an accurate current sink and current regulation in accordance with a desired standard, such as in a powered device for Power over Ethernet implementations, using simpler and more cost-effective components. The present invention addresses such a need.

SUMMARY OF THE INVENTION

The invention of the present application relates to an apparatus and method for providing a voltage-activated and accurate current sink. In one aspect of the invention, a circuit for accurately sinking current includes a zener diode coupled to a power source at the cathode of the zener diode, and first and second transistors, where the first transistor has its collector coupled to the power source and its base coupled to the cathode of the zener diode, and the second transistor has its base coupled to the anode of the zener diode and its emitter coupled to ground. A resistor is coupled between the emitter of the first transistor and the collector of the second transistor.

In another aspect of the present invention, a method for accurately sinking current includes preventing current received from a power source from flowing through a resistor when an input voltage is below a predetermined voltage level, where the predetermined voltage level is determined by the voltage rating of the zener diode. A constant current flow is allowed through the resistor above the predetermined voltage level by switching on a transistor at a voltage above the voltage rating of the zener diode.

The present invention provides low-cost, discrete components to be used in a current sink and regulation circuit. The invention provides an accurate current sink that is voltage activated at a predetermined voltage and allows necessary analog handshaking under a desired standard. The present invention allows a device using the circuit, such as a powered device under the Power over Ethernet standard, to avoid the use of expensive components such as operational amplifiers and high voltage level shifters, and therefore be much reduced in costs. Further low-cost circuits of the present invention are provided for isolating a load and for current limiting.

DETAILED DESCRIPTION

The present invention relates to relates generally to current regulation circuits, and more particularly to constant current sink circuits. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular circuits provided in particular implementations. However, one of ordinary skill in the art will readily recognize that this system will operate effectively in other implementations. For example, the circuits described for use with the present invention can take a number of different forms.

To more particularly describe the features of the present invention, please refer to FIGS. 1-7 in conjunction with the discussion below.

Figure 1:
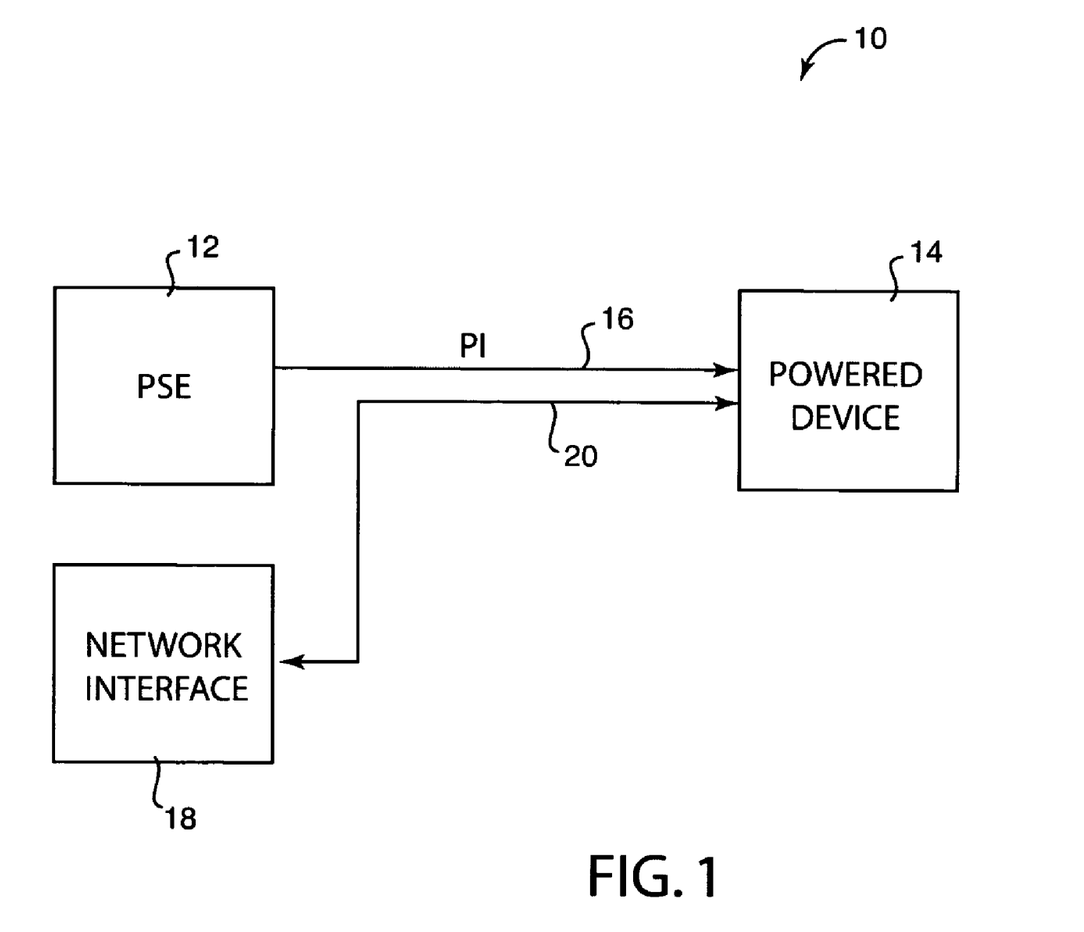
FIG. 1 is a block diagram illustrating a Power over Ethernet system suitable for use with the present invention.

FIG. 1 is a block diagram of a Power over Ethernet (PoE) system 10 suitable for use with the present invention. System 10 includes power sourcing equipment (PSE) 12 and a powered device (PD) 14. PSE 12 can be any equipment or device which can supply power to the powered device 14. For example, a common PoE implementation includes an Uninterruptible Power Supply (UPS) or other power supply as PSE 12, but any power source can be used that can provide the desired power levels, such as batteries, etc.

The PSE 12 provides power over a power interface (PI) 16. In a Power over Ethernet implementation, the power interface 16 is included in an Ethernet cable; other embodiments may similarly provide the power interface 16 as a communication link or medium, or as separate interface from a communication link.

Powered device (PD) 14 is any electronic device that can receive power from the PSE (and any other device connected via the PSE) over the power interface 16 to operate its components using that power. In the described Power over Ethernet embodiment, the powered device 14 also sends and/or receives data over a communication link; thus, the powered device 14 can be a voice-over-Internet telephone, a video camera, a point-of-sale device, a security scanner or camera, or other suitable device useful in a communication network. Other embodiments or standards can use the circuits of the present invention in any suitable device that receives power over a suitable power interface.

A network interface 18 can be provided which is connected to a communication link 20 that is also connected to the powered device 14 and allows the transmitting and receiving of data at the powered device. For example, the network interface 18 can include a router, a hub, a switch, or other device that is connected to other electronic or computer devices, thus allowing communication between those other devices and the powered device 14 via the communication link 20. The networked devices and the PD 14 can communicate via one or more well-known networking or communication protocols. In a PoE embodiment, the communication link 20 and the power interface 16 can be provided in a single physical cable, e.g., a CAT-5 cable or other standardized cable. In some embodiments, the PSE 12 can be incorporated in the network interface 18 to form a single device designed for PoE or other standard incorporating power interface and communication link. In other embodiments, the PSE 12 can be separate from the network interface 18; for example, a network cable can be connected between the PSE 12 and network interface 18, and another network cable can be connected between the PSE 12 and the PD 14, such that the data from the network interface 18 passes through the PSE 12 to the PD 14, and the PSE 12 supplies the power to the PD 14.

PoE has particular minimum requirements which all powered devices operating under the standard must adhere to in order to acquire power from the PSE or power interface. These requirements help to minimize the cost of powered devices 14 which are typically cost sensitive products, and the major burden of power control and discovery of the power device 14 is put on the PSE 12. Thus, the PSE 12 is typically the more centralized, integrated, and expensive part of the system.

These minimum requirements include a "signature resistance" that is provided in the PD 14, where the PSE 12 identifies the PD 14 as a compliant device that can receive power from the PSE by detecting the signature resistance. For example, in the current PoE standard, the signature resistance must be 19 k-ohms to 26.5 k-ohms, and the capacitance across the leads of the power interface must be less than 100 nF. Furthermore, the minimum requirements include an under voltage lockout (UVLO) that occurs less than 20.5 volts and greater than 36 volts, so that the signature resistance must be detected when a voltage is provided to the PD below the UVLO voltage. This voltage requirement prevents a bad signature resistance measurement and also prevents a greater than 100 mA classification current to flow, which, if they occurred, would result in power being withheld from the device 14.

Specifications or parameters which can optionally be used in Power over Ethernet embodiments include a classification current drawn by the powered device 14 from the power interface 16, where the magnitude of classification current drawn indicates to the PSE 12 the power class of the powered device. This current is measured when the PI voltage is between 14.5 v and 20.5 v. The power class indicates the maximum amount of power that the device 14 will draw and can be allocated from the PSE, and can indicate the priority that the device 14 has in receiving power. This classification and priority can be important in some embodiments, since some PSE power sources may not be capable of providing maximum power output to all ports and devices on the network. For example, the first ports to be powered down in a power shortage can be those without a reported class (Class 0).

Another optional specification for PoE is that inrush current limiting can be provided if $C_{in}$, the capacitance at the input port of the PD 14, is greater than 180 uF. In most cases, this limiting is not required, but it can be added in the embodiment of the present invention at very low additional cost, as explained below with respect to FIG. 5. This current limiting prevents damage or over-stress of components in the PD 14.

Figure 7:
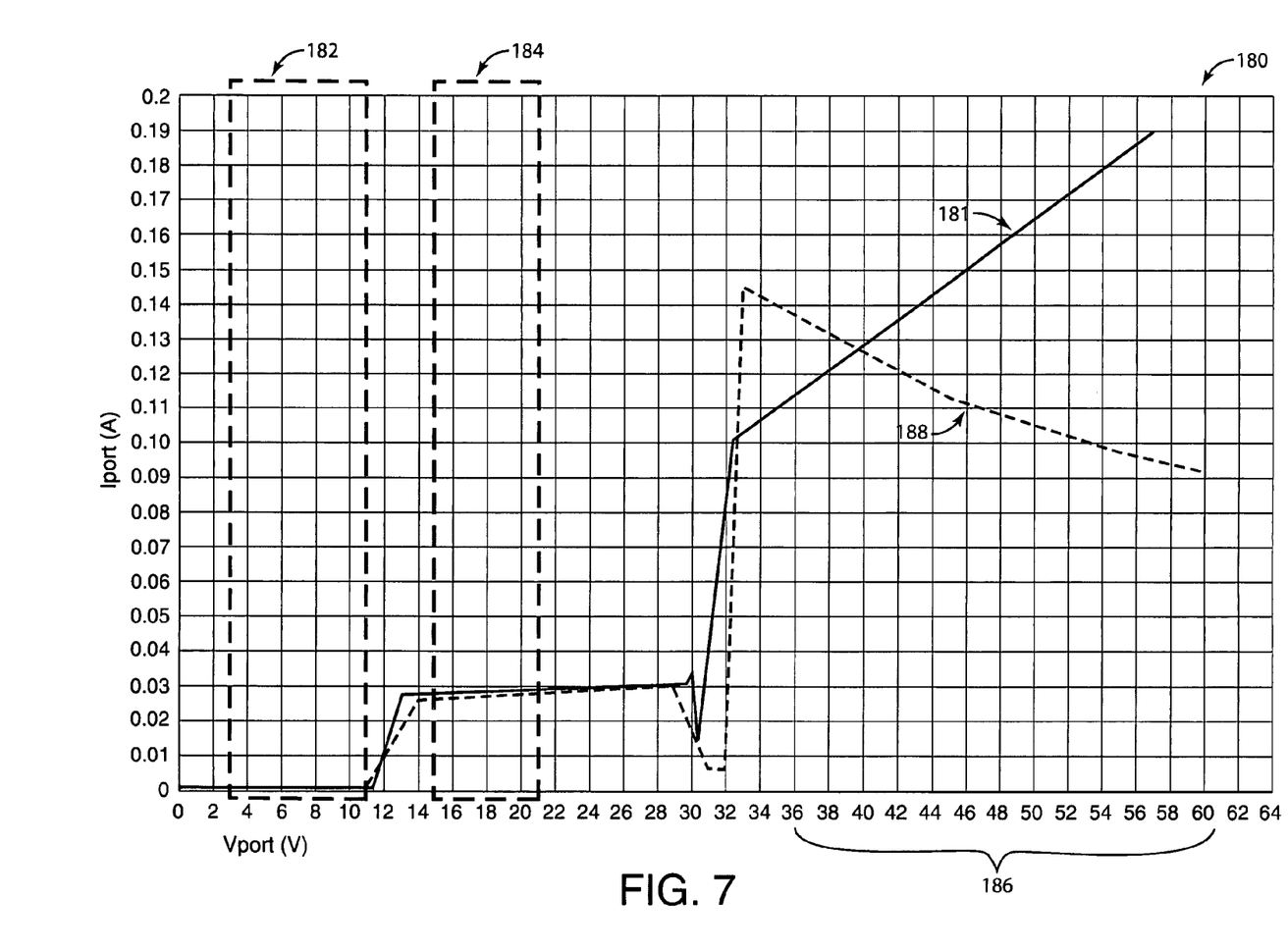
FIG. 7 is a graph illustrating the overall operation of the circuits of FIG. 2.

As explained in greater detail with respect to FIG. 7, in a typical sequence of providing power to a powered device 14, the PSE 12 first starts a "discovery" process in a particular voltage range in which it determines whether the powered device is compatible or compliant with the standard under which it operates, e.g., PoE, and whether the PSE should supply power to the device. If the device is recognized as compatible, the PSE can provide a voltage in a higher voltage range to determine the power classification of the device. Once classification is complete, the PSE can supply power to the powered device at a higher operating range. The powered device 14 typically converts the supplied voltage to a lower operating voltage.

Other embodiments can use other standards besides the PoE standard described above. Any implementation that requires predetermined current and/or voltage levels for particular detection sequences and/or providing operating power can be used with the present invention. For example, different detection and power-supplying procedures or sequences can be used in other embodiments or standards.

Figure 2:
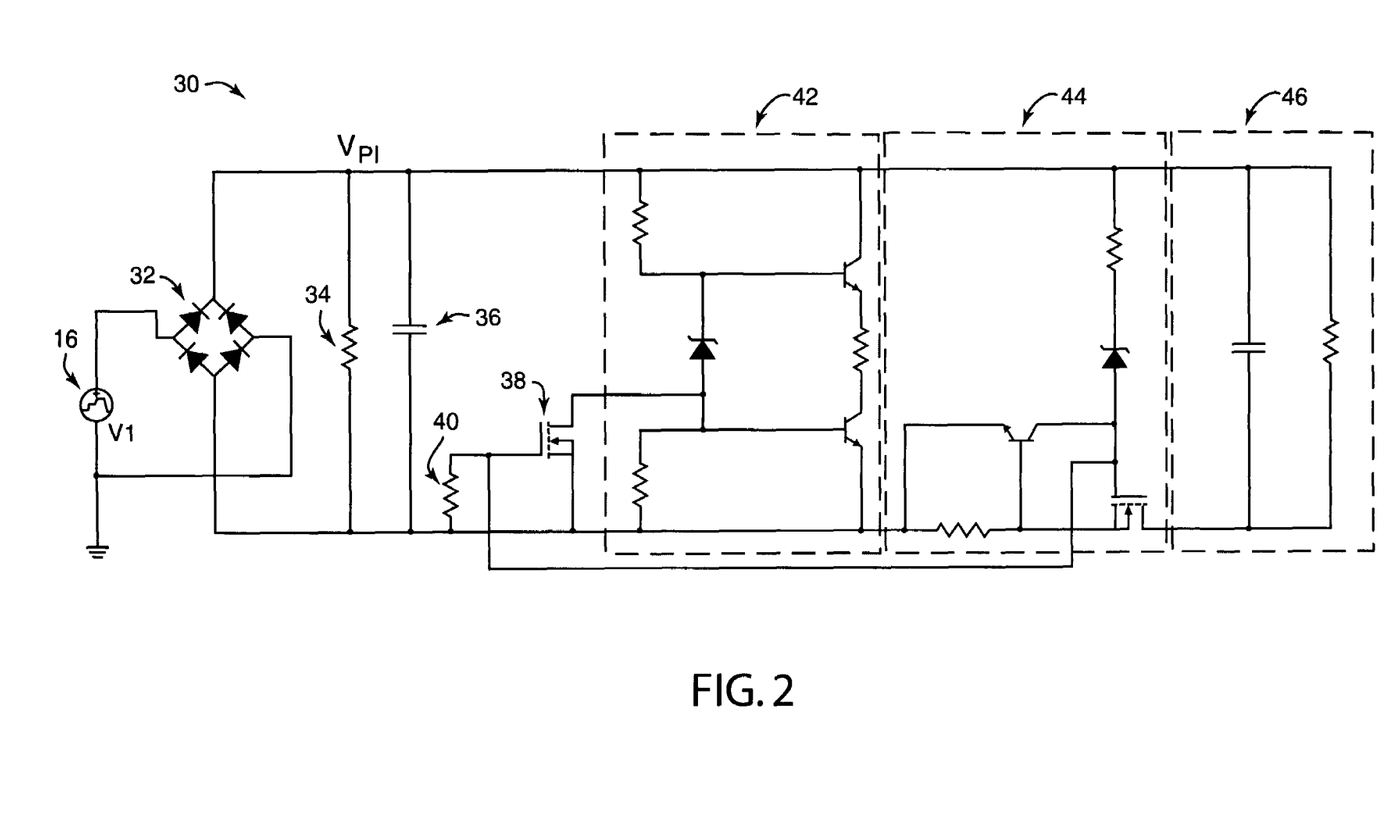
FIG. 2 is a schematic diagram illustrating circuits of the present invention provided in a powered device.

FIG. 2 is a schematic diagram of circuits 30 of the present invention included in the powered device 14 of the system of FIG. 1. Circuits 30 are dedicated to the power reception aspects of powered device 14, and do not deal with any incoming data over the communication link 20. This description therefore does not detail the communication link aspects in the PD 14.

Power interface 16 is represented as a voltage source V1 which provides an input voltage Vport, indicating the input voltage and current ("port voltage" and "port current") that is supplied by the PSE 12 over the power interface 16 at the input port to the circuit (which is the input port to PD 14). For example, voltage source V1 can represent the connection of a network cable at an input connector of the powered device 14, where the data communication line is not shown in FIG. 2.

Bridge rectifier 32 is connected to the power interface 16 as shown, and includes four diodes. The rectifier 32 creates a current that flows in the same direction during all cycles of an alternating-current input, as is well-known to those of skill in the art.

A signature resistor 34 is provided between the positive voltage terminal and ground. Signature resistor 34 is used, in a PoE embodiment (or similar embodiment), to provide the resistance that is checked by the PSE 12 to determine whether the powered device 14 is compatible with the PoE standard. For example, in the PoE standard, a signature resistance of 19 k ohms to 26.5 k ohms is required to provide power to the powered device 14, and thus in a PoE embodiment the signature resistor 34 would have a resistance value within this range.

The power interface voltage $V_{PI}$, referenced in the Figures and description herein, is the voltage across the signature resistor 34, after the bridge rectifier 32, as indicated in FIG. 2. This voltage thus differs from the port voltage Vport provided at the input to the powered device 14.

A capacitor 36 is shown in circuit 30 to indicate the capacitance that is detectable by the PSE 12 at the input ports of the powered device 14. Thus, capacitor 36 is not a discrete capacitor component, but is simply a representation of parasitic capacitance and any other capacitance at the input port of the circuit. A power-over-network embodiment, such as PoE, may have a capacitance requirement to detect the powered device 14 as compatible with the standard. For example, in the PoE standard, the capacitance across the power interface must be less than 100 nF for the PSE 12 to provide power to the powered device 14.

Transistor 38 and resistor 40 are used to turn off the classification circuit 42 to reduce power dissipation in a transistor in the classification circuit 42 (i.e., transistor 104; see FIG. 3), while not removing the regulated voltage from the emitter of transistor 104 for use by other circuits. For example, transistor 38 can be a MOSFET transistor. Resistor 40 is connected between the gate and source of a MOSFET transistor in the current limit circuit, described in greater detail below and with respect to FIG. 5.

Classification circuit 42 of the present invention is coupled to the power interface 16 as shown. This circuit is a feature of the PoE standard which allows a PSE 12 to classify the priority of supplying power to a powered device 14 based on the class of that device, where the class is determined based on a classification current that is drawn by the powered device in a predetermined voltage range. Classification circuit 42 sinks the required amount of current to classify the powered device 14 in one of a plurality of classes, e.g., from Class 0 to Class 4, or any other desired classes as implemented by a particular standard. The operation of classification circuit 42 is described in greater detail with respect to FIG. 3.

A limit circuit 44 of the present invention is coupled to the classification circuit 42 as shown. This circuit provides an under-voltage lockout and isolates the load 46 from the power interface 16 during discovery procedures performed by the PSE 12. Circuit 44 also limits the current received by the powered device until the PSE 12 can remove power from the input port due to an over-current condition. The operation of the limit circuit 44 is described in greater detail with respect to FIG. 5.

Figure 5:
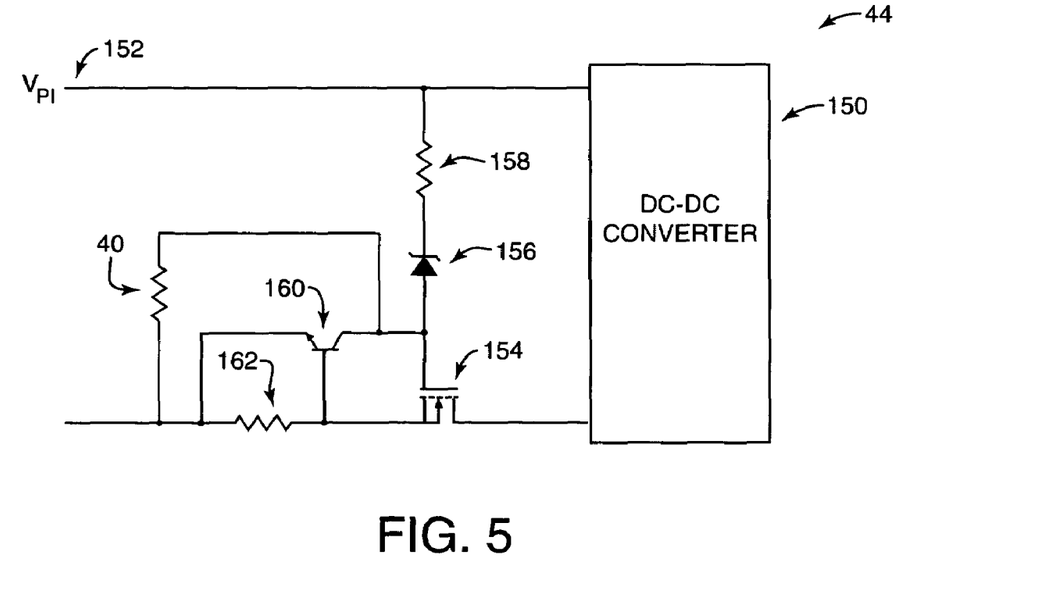
FIG. 5 is a schematic diagram illustrating a limit circuit of the present invention for isolating a load from voltages under a desired operating voltage and for limiting current in circuit components.

A load 46 is coupled to the limit circuit 44 and can include a variety of different circuits in different embodiments, and is symbolized by a resistor and capacitor in FIG. 2. In many PoE embodiments (and as shown in FIG. 5), load 46 is a DC-DC converter, which is typically provided in the powered device 14 to transform the voltage provided over the power interface 16 seen the port of the device 14 to a voltage that is more suitable for the electronics in the powered device 14. Typically, the input voltage is lowered by the DC-DC converter, e.g., from 48 volts to 5 volts, where the main electronics in the powered device 14 operates based on 5 volts. The remainder of electronics in the electronic device 14 can include any components and circuits needed to implement the device as is well known, and these components and circuits are not shown in FIG. 2.

Figure 3:
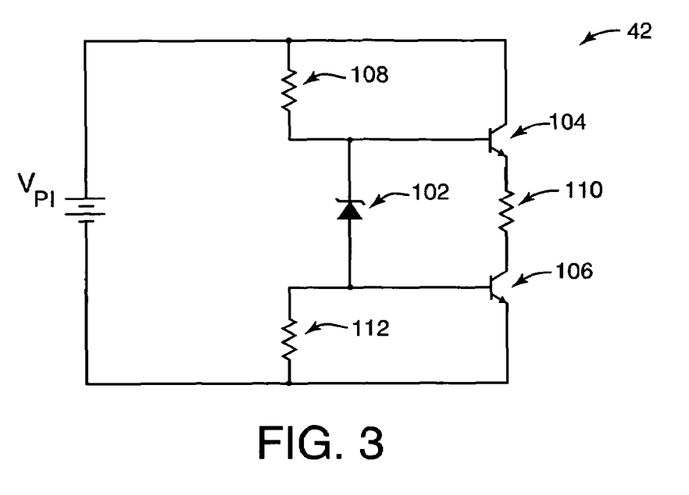
FIG. 3 is a schematic diagram illustrating a classification circuit of the present invention for sinking a classification current from a power-supplying device.

FIG. 3 is a schematic diagram of the classification circuit 42 of FIG. 2 of the present invention, which sinks a precise, predetermined classification current from the power interface 16 in a predefined voltage range to indicate to the PSE 12 a particular power class of the power device 14.

In a Power over Ethernet embodiment, the requirement of a classification circuit is that it draw zero current when the power interface voltage $V_{PI}$ is below 10.1 volts, and that it draw a defined, fixed classification current when $V_{PI}$ is between 14.5 volts and 20.5 volts. Voltage $V_{PI}$ in FIG. 3 represents the voltage across the signature resistor 34 of FIG. 2 (which is 2 volts less than the port voltage, in the described example, due to bridge rectifier 32).

Circuit 42 includes a zener diode 102 that is connected to a base of a transistor 104 at the cathode of the diode, and to a base of a transistor 106 at the anode of the diode. For example, zener diode 102 can have a voltage rating of 9.1 volts and the transistors can be low-cost bipolar NPN transistors. Resistor 108 is coupled to the cathode of zener diode 102 and the base of transistor 104, and resistor 110 is coupled between the emitter of transistor 104 and the collector of transistor 106. Resistor 112 is coupled between ground and the base of transistor 106/anode of diode 102. For example, in the described Power over Ethernet example, resistor 108 can have a value of 5.6 k ohms and resistor 112 can have a value of 1 mega-ohm.

The zener diode 102 and transistors 104 and 106 set a constant current and perform the functions of preventing classification current flow until $V_{PI}$ is greater than 10.1 volts (which is the top end of the signature voltage range). The zener diode 102 acts as a voltage activation reference and a current limit reference, such that when the voltage at node 103 reaches the breakdown voltage of the zener diode, the resulting voltage at node 105 turns on the transistor 106, thereby allowing a constant classification current to flow through transistor 104, resistor 110, and transistor 106. When including the voltage drops from resistors 108 and 110, the breakdown for diode 102 occurs at the desired $V_{PI}$ activation voltage (10.1 volts in a PoE embodiment). The diode acts as a current limit reference since port current is a direct function of the zener diode voltage (Iport is approximately equal to the voltage at the zener diode 102, divided by the resistance at resistor 110). Resistor 108 adds an amount of current that is a small proportion of the overall current and represents a known, fixed 1 mA variation over the classification voltage range.

These components also perform the function of cancelling variations in the base-emitter voltage (Vbe) of transistors 104 and 106 in the classification circuit 42 by making the current independent of these variations. The Vbe of transistor 106 cancels the Vbe drop from transistor 104 so that the voltage at the diode 102 (Vd) is always seen across the resistor 110 independently of the Vbe of transistor 104 (without transistor 106, the voltage across resistor 110 would be Vd minus the Vbe of the transistor 104). Since the base-emitter voltages of bipolar transistors can vary with temperature, yield, current level, and other factors, it is desirable to make the current independent of such Vbe variations is important to increase constant current stability, as this circuit accomplishes.

Resistor 110 determines the classification ("class") of power for the device. Each power class has a different maximum power requirement; in the PoE standard, the classes range from 0 to 4. In a PoE embodiment of the present invention, the resistance value of resistor 110 determines a particular classification current that determines the class assigned, as indicated in

TABLE 1

| Class | Resistor 110 value |
|---|---|
| Class 0 | Do not include classification circuit in powered device |
| Class 1 | 953 ohms (for a less than 4 Watt powered device) |
| Class 2 | 536 ohms (for a less than 6.5 Watt powered device) |
| Class 3 | 340 ohms (for a less than 13 Watt device) |
| Class 4 | 270 ohms (when available) |

In general, the higher the class, the greater the power required by the powered device. A priority that the powered device 14 has in receiving power from the PSE 12 can also be determined from class; e.g., a Class 0 device can be cut off from power before higher class devices if there is a power shortage.

The present invention thus provides current limiting and voltage regulation in a current sink using simpler, less costly components without requiring the high-cost operational amplifiers, high-voltage level shift circuits, and other components of prior implementations.

Figure 4:
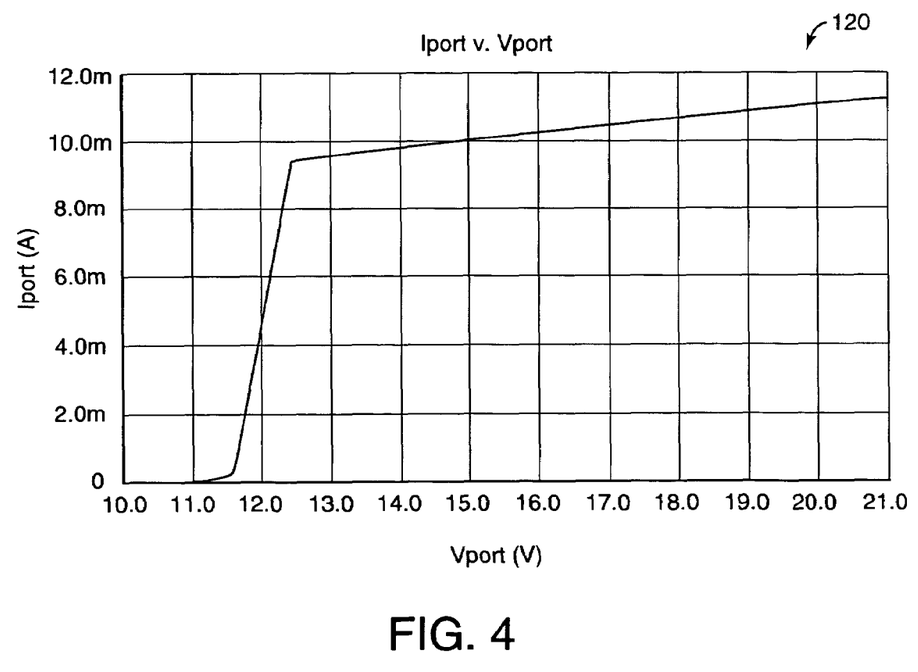
FIG. 4 is a graph illustrating the operation of the classification circuit of FIG. 3.

FIG. 4 is a graph 120 illustrating the behavior of classification circuit 42 of FIG. 3 with regards to input port voltage Vport and the port current Iport (according to the PoE specification). The graph 120 shows the approximate voltage range over which the classification current of the described embodiment is intended to operate, 10 volts to 21 volts. Note that Vport, in the embodiment of FIG. 2, is approximately 2 volts higher than $V_{PI}$ due to the voltage drop from bridge rectifier 32.

According to the graph 120, the current Iport is limited at close to zero until Vport reaches about 11.5 volts, at which point the current Iport rises steeply until Vport is about 12.5 volts. From 12.5 volts to greater than 21 volts, the current Iport is approximately level with a minor slope, at an Iport level of about 10 to 11 mA. This range covers the voltage range where the classification current should be providing the desired classification current (14.5 to 20.5 volts in the described embodiment).

The minor slope of the Iport current above the voltage rating of zener diode 102 (e.g., 9.1 volts) to the constant current region (e.g., Vport=12.5 volts) is proportional to transistor 104's hfe or beta (the forward current gain of the transistor) and 1/R1, where R1 is the resistance of the resistor 108. The minor slope on top of the constant current (12.5 to 21 volts Vport) is the additional resistance R1 in series with diode 102 (D1) and the Vbe of transistor 106 (Q1). The equation for the power interface current $I_{PI}$ above the turn-on voltage of transistor 106 is therefore:

$$I_{PI} = (V_{D1} - V_{CE}satQ1)/R2 + (V_{PI} - V_{D1} - VbeQ1)/R1 + V_{PI}/25k,$$

where R2 is the resistance of resistor 110 and $V_{CE}satQ1$ is the collector-emitter saturation voltage of transistor 106.

FIG. 5 is a schematic diagram of the limit circuit 44 of the present invention of FIG. 2, which allows proper voltage and current levels to be used in the power device 14. Limit circuit 44 provides an under-voltage lockout and isolates the load 46 from the power interface 16 during discovery procedures performed by the PSE 12, and also optionally limits the current received by the powered device until the PSE 12 can remove power from the input port of PD 14 due to an over-current condition.

Power interface voltage $V_{PI}$ is provided at an input 152 of the limit circuit 44, where $V_{PI}$ in FIG. 3 represents the voltage across the signature resistor 34 of FIG. 2. This voltage is not substantially affected by the classification circuit 42 for the voltage range of interest to limit circuit 44. The load 46 is here represented by a DC-DC converter 150.

The voltage lockout portion of circuit 44 includes a transistor 154, a zener diode 156, and a resistor 158. Transistor 154 is used to isolate the load 46 from the power interface 16 during the discovery process of the PSE 12 and the classification current stage, i.e., transistor 154 provides the under-voltage lockout for the load when the power interface voltage $V_{PI}$ is less than 20.5 volts. Since the PSE's power is typically over 36 volts (in a PoE embodiment) to operate the DC-DC converter 150 and powered device 14, the lockout can occur under a higher voltage than 20.5 volts. In the described embodiment, the transistor 54 is a MOSFET, e.g., a low-cost 100 volt, 600 mA MOSFET in a SC70 package, or other suitable MOSFET.

The anode of a zener diode 156 is coupled to the gate of the transistor 154, and a resistor 158 is coupled between the cathode of zener diode 154 and the input 152. In the example of FIG. 5, the zener diode 156 can have a voltage rating between 21 volts and 30 volts, and the resistor can have a resistance value of 51 k ohms. The voltage rating of the zener diode 156 allows current to travel through the reverse-bias diode only at voltage levels above the voltage rating, and thus determines the switch-on voltage for the transistor 154 to allow power to pass to the load. Thus, the switch-on voltage will be the diode's voltage rating plus the voltage drop across resistor 158. In many embodiments, to provide maximum gate drive at transistor 154 and allow the transistor 154 to turn on properly at the lowest operating voltage of the DC-DC converter 150 (e.g., 36 volts), a voltage value at the lower end of the range can be used for the zener diode to provide a lower switch-on voltage; e.g., a 24 volt rating. In the described embodiment, the switch-on voltage is about 30 volts, so that the transistor 154 is turned off below 30 volts and is turned on above 30 volts to allow power to reach the load.

Resistor 158 is also used to limit the voltage at the transistor 154. In the desired low-cost embodiments, it may be important to limit the voltage at the gate of MOSFET transistor 154 to a maximum voltage (e.g., 20 volts), since many low-cost MOSFET transistors require such operating conditions. This limit can be achieved by providing the resistor 158 and another resistor 40 (also shown in FIG. 2) connected between the gate and the source of transistor 154, such that when $V_{PI}$ is, for example, 60 volts, the maximum voltage Vmax between gate and source of transistor 154 is 20 volts. The resistance of resistor 40 can be determined based on the voltage value of the zener diode 156 and the resistor 158. For example, the value of resistor 40 (R3) can be determined using the following formula:

$R3 = Vmax\ (R4)/(V_{PI} - Vmax - Vz)$, where R4 is the resistance of the resistor 158, Vmax is the maximum desired voltage at the transistor 154 (e.g., 20 volts), $V_{PI}$ is the maximum input voltage (e.g., 60 volts), and Vz is the voltage rating of the zener diode 156. Thus, if Vz is 24 volts as in the example described above, then R3 can have a value of 63 k ohms.

An optional inrush current limit circuit of the present invention can be included in circuit 44 if the input capacitance of the powered device 14 is greater than a predetermined amount, e.g. 180 microfarads in the described PoE embodiment. This current limit circuit includes bipolar transistor 160 and a resistor 162. The collector of bipolar transistor 160 can be coupled to the node between zener diode 156 and transistor 154, and resistor 162 can be connected between the base and the emitter of the transistor 160, to collectively provide the current limiting function. For example, transistor 160 can be a general purpose NPN transistor, and resistor 162 can be a resistor of 1.5 ohms and having a maximum power dissipation of 250 mW. When the voltage across the resistor 162 reaches the base-emitter voltage Vbe of the transistor 160, transistor 160 is turned on, and the gate of the isolation transistor 154 is pulled low and enters a constant current region, effectively preventing the current from reaching higher levels. After 75 ms, the PSE 12 removes power from the input port of the PD 14 due to an over current condition (the PSE is preferably constantly monitoring the port current Iport to detect this), and therefore the transistor 154 will not overheat. The transistor 160 and resistor 162 are very low cost components, allowing the current limiting circuit to be added to a powered device 14 at minimal expense.

Figure 6:
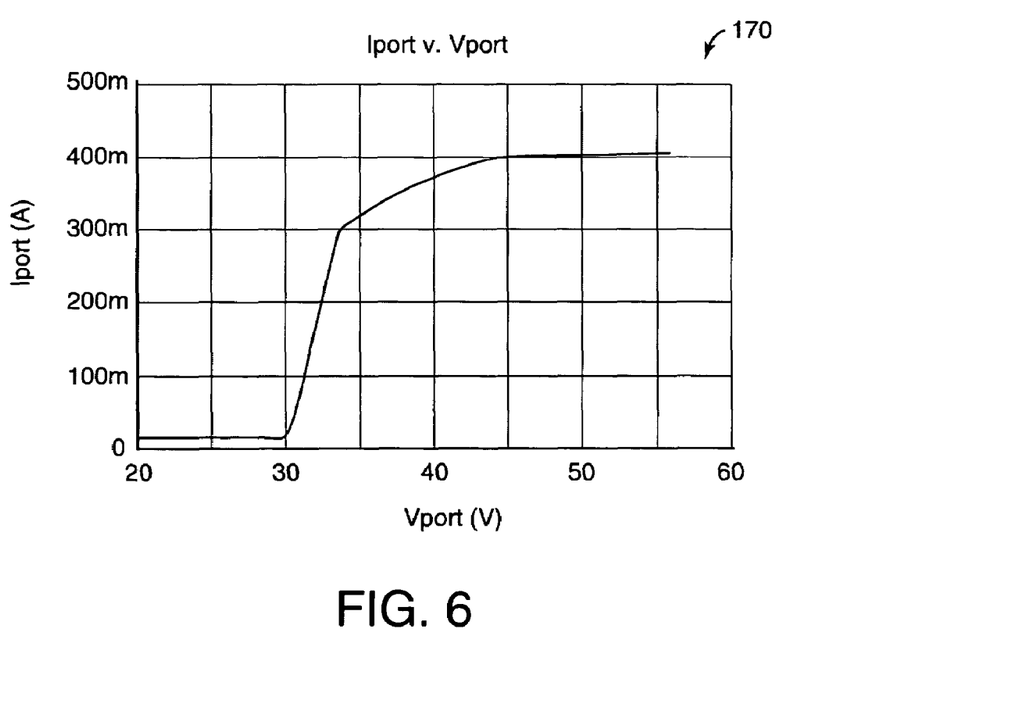
FIG. 6 is a graph illustrating the operation of the limit circuit of FIG. 5.

FIG. 6 is a graph 170 illustrating the behavior of the limit circuit 44 of FIG. 5 with regards to port voltage Vport and the port current Iport. The graph 170 shows the approximate voltage range over which the limit current of the described embodiment is intended to operate, i.e., 20 volts to 60 volts, and the behavior when including component values as described above.

Graph 170 shows that under 30 volts, the current is locked out and is close to zero, thereby isolating the load 46 from the power interface while the PSE can perform a discovery process for the powered device 14 at the lower voltage levels (to detect the signature resistance). Although the PoE specification allows power to be supplied above 20.5 volts, most PSE 12 devices operate above at higher voltages, and 30 volts is well below most operating voltage ranges. At 30 volts and above, the limit circuit comes out of its lockout condition and the MOSFET transistor 154 switches on, enabling power to be provided to the DC-DC converter 150 (or any other load that is present).

As shown in the graph 170, a current limit is provided at 400 mA as the voltage reaches approximately 45 volts. The limit is provided by the current limit circuit including transistor 160 and resistor 162, as explained above, and allows the PSE to remove the over-current condition after a particular time interval without overheating the components. Other embodiments may have switch-on voltage and current limits provided at other levels.

FIG. 7 is a graph 180 illustrating the overall operation of the circuits of the powered device 14 shown in FIG. 2. Solid line graph 181 represents the circuit response when a resistive load 46 is provided, while dashed line 188 represents the circuit response when load 46 is a DC-DC converter or similar active load. Initially, the PSE 12 sends out a voltage on the power interface 16 and looks for a signature resistance at the powered device within the predetermined range. In the Power over Ethernet example described herein, this signature range of voltage is between 2.7 and 10.1 volts, as indicated by dashed line 182. Although the scale of graph 180 does not show it, the PSE causes the current to be sloped within this range to detect the signature resistance, e.g., from about 0 amps to about 0.004 amps across the signature voltage range. For example, the PSE 12 can send out voltage values in particular steps, such as in 1 volt increments, and determine the change in current flow at each of those steps to determine the corresponding resistance. Thus, if the PSE provides a voltage 1 volt higher than the last step, then the change in current would be about 40 microamps, which would correspond to a signature resistance of 25 k ohms, if the device 14 were within the PoE standard. If a resistance within the desired signature resistance range is found, the PSE 12 determines that the powered device 14 is compatible with its standard and it can provide power to the device (otherwise, the PSE assumes that the device is not compatible with its standard, and does not supply power to it).

The PSE 12 then attempts to determine the class of the powered device to determine the device's maximum power and priority when providing power. The PSE provides a voltage within a predetermined range and senses the resulting current level (or resistance level) that classifies the powered device in a power class. In the PoE example of FIG. 7, the classification range is between 14.5 and 20.5 volts, as indicated by dashed line 184. Depending on the class of the device 14, the resulting level of current will vary in this range, as determined by the resistor 110 in the classification circuit 42 as described above. An example of a PoE Class 3 powered device is shown in FIG. 7. For Class 1 or Class 2 devices, for example, the current levels would be approximately parallel to the shown section of line 181 within the classification voltage range 184, but at current levels approximately 0.01 A or 0.02 A below the shown level, respectively.

After the classification of the powered device is determined from the level of classification current, the PSE 12 can provide the power that will operate the powered device 14. This voltage range for a PoE embodiment is indicated in FIG. 7, where the range 186 is the typical PSE valid operating voltage range (about 36 to 60 volts). At those voltage levels, the circuit described herein provides a rising current at higher voltages as indicated by line 181, as would be expected for a resistive load. Dashed line 188 shows results for the circuit of the present invention when a DC-DC converter 150 is provided as the load, where current falls as voltage rises.

It should be noted that, although the present invention is described above in the context of particular components with specific values, other components with different values can be used in other embodiments. Furthermore, embodiments other than Power over Ethernet embodiments can make use of the present invention for its accurate current sinking, voltage regulation, and current limiting abilities.

The present invention uses low-cost, general purpose components such as bipolar transistors and zener diodes to achieve a precise current sink without the need for high-cost components such as operational amplifiers and high voltage level shifters. The circuit sink circuit also prevents current flow below a known voltage and provides cancellation of the effect of transistor Vbe variations on constant current level. The circuit can be utilized as a high voltage regulator for auxiliary circuits at a voltage above a known voltage to save additional component use with the addition of one zener diode in the limit circuit.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A circuit for accurately sinking current, the circuit comprising:
    a zener diode coupled to a power source at the cathode of the zener diode;
    first and second transistors, wherein the first transistor has its collector coupled to the power source and its base coupled to the cathode of the zener diode, and wherein the second transistor has its base coupled to the anode of the zener diode and its emitter coupled to ground; and
    a resistor coupled between the emitter of the first transistor and the collector of the second transistor, wherein the power source supplies power to a powered device coupled to the circuit, wherein the resistance value of the resistor designates a power class for the powered device.

2. The circuit of claim 1 wherein the circuit does not require any operational amplifiers or level shift circuits.

3. The circuit of claim 1 further comprising a resistor coupled between the cathode of the zener diode and the power source.

4. The circuit of claim 1 further comprising a resistor coupled between the anode of the zener diode and the power source.

5. The circuit of claim 1 wherein the power source includes power-sourcing equipment coupled to the circuit and supplying power to the powered device coupled to the circuit, wherein the power class indicates to the power-sourcing equipment the maximum power requirements of the powered device.

6. The circuit of claim 5 wherein the zener diode prevents current flow though the resistor until the voltage from the power source is above a predetermined level, and wherein a level of current flowing through the resistor is used by the power-sourcing device to classify the power requirements of the powered according to a predetermined range of classes.

7. The circuit of claim 5 wherein the powered device sends and receives data over a data connection and receives power from the power source over a power interface, wherein the data connection and the power interface are physically provided within a single cable.

8. The circuit of claim 7 wherein the cable is an Ethernet cable.

9. The circuit of claim 8 wherein the powered device receives power from the power-sourcing equipment according to the Power over Ethernet standard.

10. The circuit of claim 1 further comprising a limit circuit for isolating a load from the power source when the output voltage of the power source is within a predefined voltage range.

11. The circuit of claim 10 wherein the limit circuit includes:
    a limit zener diode coupled to the power source at the cathode of the limit zener diode; and
    a transistor having its gate coupled to the anode of the limit zener diode, its drain coupled to the load, and its source coupled to ground, wherein the transistor isolates the load from the power source until the voltage from the power source rises above a predetermined level, at which point power is allowed to pass to the load.

12. The circuit of claim 11 wherein the load is a DC-DC converter for converting the voltage from the power source to an operating voltage for a device coupled to the DC-DC converter.

13. The circuit of claim 1 further comprising a current limit circuit coupled to the first transistor and to ground, the current limit circuit including an isolation transistor coupled to a load, the isolation transistor preventing current to pass to the load under a predetermined level.

14. The circuit of claim 13 wherein the current limit circuit includes a bipolar transistor and a resistor, where the bipolar transistor has a collector coupled to the gate of the isolation transistor, an emitter coupled to ground, and a base coupled to the source of the isolation transistor, and the resistor is coupled between ground and the base of the bipolar transistor.

15. A method for accurately sinking current using a current sink circuit, the method comprising:
preventing current received from a power source from flowing through a resistor when an input voltage is below a predetermined voltage level, the predetermined voltage level determined by the voltage rating of a zener diode in the current sink circuit; and
allowing a constant current flow though the resistor when the input voltage is above the predetermined voltage level, wherein the constant current flow is allowed by at least one and not more than two transistors in the current sink circuit, and wherein the constant current flow is allowed by switching on one of the transistors in response to a voltage that is above the voltage rating of the zener diode and is provided at the cathode of the zener diode.

16. The method of claim 15 wherein the preventing current flow and the allowing constant current flow do not require any operational amplifiers or level shift circuits.

17. The method of claim 15 wherein the transistor switched on is a second transistor, and wherein the current flows through a first transistor before it flows though the resistor.

18. The method of claim 17 wherein the first and second transistors are bipolar transistors.

19. The method of claim 15 wherein the power source includes power-sourcing equipment supplying power to a powered device coupled to the transistor, wherein the level of current flowing through the resistor is used by the power-sourcing device to classify the power requirements of the powered according to a predetermined range of classes.

20. The method of claim 15 further comprising isolating a load from the power source when the output voltage of the power source rises above a predetermined voltage, using a limit circuit coupled to the transistor.

21. The method of claim 20 further comprising preventing current through the limit circuit from going above a predetermined level.

22. A circuit for accurately sinking current, the circuit comprising:
a zener diode coupled to a power source at the cathode of the zener diode;
first and second transistors, wherein the first transistor has its collector coupled to the power source and its base coupled to the cathode of the zener diode, and wherein the second transistor has its base coupled to the anode of the zener diode and its emitter coupled to ground;
a resistor coupled between the emitter of the first transistor and the collector of the second transistor; and
a limit circuit for isolating a load from the power source when the output voltage of the power source is within a predefined voltage range.

23. A method for accurately sinking current, the method comprising:
preventing current received from a power source from flowing through a resistor when an input voltage is below a predetermined voltage level, the predetermined voltage level determined by the voltage rating of a zener diode; and
allowing a constant current flow through the resistor when the input voltage is above the predetermined voltage level by switching on a transistor in response to a voltage that is above the voltage rating of the zener diode and is provided at the cathode of the zener diode, wherein the power source supplies power to a powered device coupled to the transistor, wherein the level of current flowing through the resistor is used by the power source to classify the power requirements of the powered device.

24. The method of claim 23 wherein the powered device sends and receives data over a data connection and receives power from the power source over a power interface, wherein the data connection and the power interface are physically provided within a single cable.

25. The method of claim 24 wherein the cable is an Ethernet cable, and wherein the powered device receives power from the power-sourcing equipment according to the Power over Ethernet standard.

26. A method for accurately sinking current, the method comprising:
preventing current received from a power source from flowing through a resistor when an input voltage is below a predetermined voltage level, the predetermined voltage level determined by the voltage rating of a zener diode;
allowing a constant current flow through the resistor when the input voltage is above the predetermined voltage level by switching on a transistor in response to a voltage that is above the voltage rating of the zener diode and is provided at the cathode of the zener diode; and
isolating a load from the power source when the output voltage of the power source rises above a second predetermined voltage, using a limit circuit coupled to the transistor.

27. The method of claim 26 further comprising preventing current though the limit circuit from going above a predetermined level.

* * * * *